United States Patent [19]

Hoffman, III

[11] 4,054,614

[45] Oct. 18, 1977

[54] WATER SOLUBLE POLYESTER COATING COMPOSITIONS

[75] Inventor: William A. Hoffman, III, N. Bergen, N.J.

[73] Assignee: Celanese Corporation, New York, N.Y.

[21] Appl. No.: 660,737

[22] Filed: Feb. 23, 1976

[51] Int. Cl.² .................... C08L 67/02; C08G 63/46
[52] U.S. Cl. ................... 260/850; 260/29.2 E; 260/75 R
[58] Field of Search ............. 260/75 R, 850, 29.2 E

[56] References Cited

U.S. PATENT DOCUMENTS

| | | | |
|---|---|---|---|
| 3,446,758 | 5/1969 | Wiener | 260/75 R X |
| 3,734,890 | 5/1973 | Powanda | 260/75 R |
| 3,829,530 | 8/1974 | Powanda | 260/850 |

*Primary Examiner*—Lucille M. Phynes
*Attorney, Agent, or Firm*—John A. Shedden

[57] ABSTRACT

Water soluble polyester coating compositions convertible to baked coatings characterized by chemical resistance, hardness and flexibility comprising a polyol component incorporating a minor proportion of pentaerythritol and a coupling agent constituted by phthalic anhydride. After neutralizing with a base the water soluble polyester can be interacted with a cross-linking agent, e.g., an aminoplast.

12 Claims, No Drawings

WATER SOLUBLE POLYESTER COATING COMPOSITIONS

This invention relates to industrial coatings and more particularly water-borne polyester coating compositions.

Polyester coating compositions are well-known, especially for baked or thermoset enamels widely utilized in coating kitchen appliances, washing machines, industrial coils etc. Such materials, based upon polyol-polybasic acid resins, are commonly formulated for use in organic solvent systems. As a result of ecological concern, and the impact of local and federal regulations under environmental protections laws, interest has developed in water-borne systems for industrial coatings. The requirement of these coatings is that they consist of at least 80 volume percent water in the solvent portion, thereby reducing if not eliminating the proportion of photochemically reactive organic solvent employed. In addition, the coating composition must retain or achieve competitive properties in other respects such as flow and leveling characteristics, and be convertible into a baked coating of suitable flexibility, hardness and chemical resistance.

It is known that water solubility can be achieved in coating resins by the provision of neutralizable residual functionality e.g., dependent carboxyl moieties. Such functionality is typically provided by means of the late addition of a chemical coupling agent such as an acid anhydride. This agent reacts with residual, ordinarily terminal hydroxyl groups provided by the polyol component, and presents a carboxyl group for later neutralization for water solubility. However, in the case of a bifunctional agent such as phthalic anhydride an excessive proportion of the coupling agent is often required to secure the desired solubility level, and other necessary properties suffer. Moreover, for every carboxyl group provided by this coupling agent an equivalent hydroxyl functionality is removed from the chain by reaction, rendering difficult the preservation of the necessary balance of hydroxyl level for optimum performance. Retention of residual hydroxyl functionality is essential for cross-linking and substrate bonding, but is desirably minimized to reduce the number of sites susceptible to chemical attack. Accordingly, a trifunctional agent such as trimellitic anhydride is conventionally preferred.

Among the properties desirably imparted to water-borne polyesters for use in baked coatings is a combination of flexibility and hardness. Generally speaking, polyester coating resins, unlike the polyurethane types, do not offer sufficient flexibility to pass standard industry tests, such as the zero-T-bend. Increased hardness in polyester resin structure may be achieved by molecular modification, as by incorporation of pendant methyl groups, but usually only at the expense of flexibility. An increase in hydroxyl functionality with a concomitantly increased proportion of cross-linking agent produces a harder resin but also introduces brittleness, an undesirable feature. Flexibility is ordinarily considered a function of increasing diol chain length, and is associated with softness. The same combination of somewhat enhanced flexibility with softness is exhibited at the otherwise preferred low excess hydroxyl values.

A primary object of the present invention is the provision of water-borne polyester coating compositions suitable for baked coatings of modified cost/performance characteristics.

A more specific object is the modification of polyester resins to impart water solubility characteristics and convertibility to baked coatings of suitable flexibility, hardness and chemical resistance.

BRIEF DESCRIPTION OF THE INVENTION

In accordance with the invention, there is afforded at competitive cost and performance in other respects, a polyester resin component for coating compositions characterized by water solubility, coupled with considerable intrinsic hardness, remarkable flexibility and chemical resistance when conventionally formulated into a baked coating.

This is surprisingly achieved in a system comprising pentaerythritol as an essential polyol component, and phthalic anhydride as a bifunctional coupling agent. It is remarkable that hardness and flexibility properties are secured together utilizing a component of increased functionality and no extended chain length normally expected to decrease flexibility and/or lead to excess cross-linking and resultant brittleness. The effect is apparently not simply attributable to multifunctionality, as incorporation of trimethyolpropane in place of ethylene glycol in a comparable system leads to harder but less flexible materials. Moreover, excess hydroxyl level is not the governing factor, as the use of phthalic anhydride is known to reduce hydroxyl level at equivalent water solubility.

The water-borne polyester resins are prepared in conventional manner utilizing polyol and polybasic acid components known to the art. Preferably, pentaerythritol comprises a minor proportion, e.g. 10 to 50 mol percent of the polyol component, the remainder being constituted by one or more aliphatic diols. Most preferably, the diol is neopentyl glycol, but may also be ethylene glycol, 1,3 or 1,4-butanediol, or mixtures of these or other short chain diols.

The polybasic acid component may comprise one or more aliphatic or aromatic species, or mixtures thereof. Suitable performance has been achieved with systems incorporating adipic acid and isophthalic acid but other polybasic acids are contemplated including succinic acid, sebacic acid, glutaric acid, 3-methyl adipic acid, suberic acid, azelaic acid, pimelic acid, terephthalic acid, trimellitic acid; or their anhydrides.

The resin components are formulated and prepared to provide a low excess hydroxyl content. Preferably, 10 to 30 percent $$(100\% \times \frac{\text{total equiv. hydroxyl} - \text{total equiv. carboxyl}}{\text{total equiv. carboxyl}}$$

excess hydroxyl is targeted.

The esterification reaction is carried out in the customary manner at elevated temperature, monitoring water of condensation against theoretical to indicate extent of reaction, and at or near termination, the reaction mixture is cooled, the cross-linking agent is added, and acid number again monitored to achieve a desired value of 50-60.

The batch may now be directly admixed if desired with a coupling solvent such as Glycocel ® EB (monobutyl ether of ethylene glycol) reduced to a reasonable viscosity and solids level and stored, or directly converted to an aqueous solution by neutralization of the carboxyl functionality of the phthalic anhydride moieties.

Without wishing to be bound by an essentially theoretical elucidation, it appears that the performance of the resin of the invention may be due at least in part to the chain structure (and hence three dimensional cross-linked form), derivative from reaction rates of the polyol components. It is believed that the pentaerythritol likely reacts into the chain relatively late in the reaction sequence, thereby providing the terminal hydroxyl site in most cases for interreaction with the phthalic anhydride. This taken in conjunction with a relative excess of longer chain diol forming the principal extended chain may contribute to the properties.

The effect of phthalic anhydride itself, normally less desirable because of reduction in already low hydroxyl is not understood, although some elastomer property may be imparted by bonding into the chain through terminal pentaerythritol moieties.

DETAILED DESCRIPTION OF THE INVENTION

In accordance with the most preferred embodiment, a polyester formulation is provided wherein the polyol component comprises neopentyl glycol and pentaerythritol. A molar ratio of neopentyl glycol to pentaerythritol of 2:1 up to 10:1, preferably 3:1 to 7:1, is employed.

The polyol component is provided in excess of up to about 150 mol percent in accordance with common practice to insure terminal hydroxyl functionality.

The pentaerythritol-containing polyol component is preferably reacted with a dibasic acid component, most preferably an aliphatic/aromatic admixture such as isophthalic acid and adipic acid. A molar ratio of 1:5 to 5:1 may be used, although more preferably the ratio is 3:4 to 4:3.

Best results have been secured with a resin composition comprising adipic acid, isophthalic acid, neopentyl glycol and pentaerythritol in the molar ratio 3:4:7:2, reacted with 2 molar proportions of phthalic anhydride.

The coupling agent is as noted above, added late in the resin reaction sequence when essentially all of the polyol and polybasic acid constituents have reacted, as indicated by monitoring water of condensation against theoretical, and reducing acid number to a low level.

The level of chemical coupling agent is primarily selected, relative to hydroxyl functionality to secure an acid number in the range of 50 to 60, or one free carboxyl group for each 1000 gms of resin, to provide the best balance of water solubilization and low excess hydroxyl value.

The reaction with the coupling agent proceeds at an elevated temperature just sufficient to open the anhydride structure, and is terminated at the desired acid level. A feature of the present invention is the reduction in cook temperature afforded by the use of phthalic anhydride where sharply reduced temperatures of less than 150° C. e.g. 100°-120° C are suitable. Both energy conservation and reduction of color formation result.

The resins produced are of low to intermediate molecular weight e.g. 2000 to 3000, and in most cases comprise a mixture of species of m.w. ranging from about 900 to about 2500.

The reaction mixture is cooled if necessary and then typically poured into a coupling solvent for storage, such as n-butanol, isopropanol, the monoalkyl ethers of ethylene glycol, etc. The admixture is made up to a reasonable viscosity for later use commonly at 50% solids.

Aqueous solutions may be readily prepared by neutralization of the carboxyl functionality with any organic or inorganic volatile base such as an amine e.g. dimethyl ethanolamine diethyl ethanolamine, triethyl amine, etc. and dilution with water to the desired solids level. 75–90% of the amount of amine calculated to neutralize all carboxyl groups based on the acid number and the weight of resin is typically employed.

For the preparation of coatings, the solids level of the aqueous solution is usually established at about 50–60% and the pH adjusted if necessary to 8–9. The resin is then interacted with a cross-linking agent.

Any aminoplast may be used as the cross-linking agent, such as the hexamethylolmethyl melamines e.g. Cymel 301, in proportions of resin to cross-linking agent ranging from 85/15 to 70/30 by weight. Although an acid catalyst such as paratoluene sulfonic acid may be utilized whenever desired, generally the available carboxyl functionality is sufficient to catalyze the reaction for completion within a reasonable term e.g. within 30 minutes at 300° F.

The cross-linking agent may be added directly to the aqueous solution, and a coating formed by drawing down the mixture as with a 3 mil Bird blade onto standard test panels e.g. 20 guage 4×8 Bonderite 1000 panels. For test purposes, the coating is usually allowed to flash off at room temperature for e.g. 10–15 minutes, and is then baked for e.g. 30 minutes at 150° C. Pigmented coatings of all types may of course be prepared, as by forming a paste of a colorant such as titanium dioxide in the resin solution or a binder.

Surfactants may be incorporated in these compositions, as for improved appearance, such as 0.1 to 0.5%, based on resin solids, of a non-ionic e.g. Igepal CO-630; 0.06 to 0.5% of a fluorocarbon e.g. FC-430; or up to 0.3% of a silicone e.g. L.77 or L-5310; all common agents for this purpose.

Reference has been made to 'water-borne' polyesters herein, which refers to a degree of solubility in water conferred by neutralization of incorporated carboxyl functionality in the polyester resin systems described.

Evaluations consist of determining the baked coatings' hardness (Knoop hardness numbers measured on a Tukon tester) or conical mandrel, flexibility (pass or fail, zero T bend) and reverse impact resistance (inch-pound pass/inch-pound fail). In addition, the chemical resistance of the pigmented coatings is measured by contacting the surfaces with chemicals (each in a separate paraffin-sealed chamber) for 24 hours. After the chemicals and sealing-paraffin are removed with water, the surface is searched for marring and the conditions noted. Evaluations are carried out no sooner than 18 hours after the panels are baked.

The following Example sets forth without limitation a preferred embodiment of the invention including the best mode of its practice known to applicant.

EXAMPLE

A. A polyester resin was formed by a fusion process, utilizing 3 moles of isophthalic acid, 4 moles of adipic acid, 7 moles of neopentyl glycol, and 2 moles of pentaerythritol. The ingredients were charged to a 3-neck flask, equipped with a paddle stirrer, nitrogen inlet, thermometer, a steam-jacketed column topped with a head and condenser, and a heating mantle. Steam, nitrogen (0.2 cfh) and heat were started followed by stirring as soon as possible, and the temperature brought to 200° C as fast as the loss of water would allow. When approximately 90% of the theoretical amount (252 ml.) of water was removed (about 7 hours), the acid number was taken (by dissolving a small portion of the resin in 50 ml of a 3:1 (vol) mixture of xylol and 2-butanol, and titrating with 0.1 N alcoholic KOH to the phenolphtalein end point). Reaction continued (for about 12 hours) until an acid number of 10 was reached when the heat was removed. Trimellitic anhydride (TMA) was added all at once when the pot temperature was below 160° C, and the heat reapplied to raise the pot temperature to 190° C. After the TMA had completely disappeared, the acid number was monitored until it fell to 59 (excess hydroxyl, 29%). The resin was cooled to less than 140° C, and enough GLYCOCEL EB added in a steady stream to result in an 80% solution. After cooling further (below 100° C) the resin solution was stored in wide-mouth jars.

Aqueous solutions were prepared by taking a quantity of 80% resin, stirring in dimethylethanolamine (90% of the amount calculated to neutralize all carboxyl groups based on the acid number and the weight of resin) and adding sufficient water to prepare a 50% resin solution.

Clear coatings were prepared by adding Cymel 301 to the 50% aqueous solution to make 56% solutions which were 20% Cymel 301, then drawing down the mixtures with a 3-mil Bird applicator on Bonderite 1000 panels. The coated panels were flashed off at room temperature for 10 minutes then were baked at 150° C for 30 minutes.

The baked coating exhibited good chemical resistance a Knoop hardness of 19.8 and passed the conical mandrel test, but failed for excessive brittleness (Reverse Impact 36/40).

B. The same preparation was repeated, except that the base resin was combined with 2 moles of phthalic anhydride as the coupling agent, and cooked to an acid number of 54. A film coating exhibited a satisfactory Knoop hardness of 16.2, a Reverse Impact of 104/108, and passed the zero T bend test for flexibility. Chemical resistance was satisfactory (i.e. surface unmarred) to acetic acid, ethanol, methyl ethyl Ketone, 10% sulfuric acid and 10% sodium hydroxide.

1. In the production of polyester resins adapted for use in baked coatings comprising reacting at least one polybasic acid with a molar excess of at least one polyol to provide a hydroxy terminated polyester the improvement which comprises incorporating pentaerythritol as an essential element of the polyol component and reacting available hydroxyl groups in the preformed polyester with phthalic anhydride, whereby said polyester is rendered water soluble upon neutralization, and is convertible upon cross-linking to a baked coating characterized by chemical resistance, hardness and flexibility.

2. A process for the preparation of a water soluble polyester resin comprising
   1. reacting at least one polybasic acid with a molar excess of at least one polyol, said polyol consisting essentially of a minor proportion of pentaerythritol to form a hydroxy terminated polyester;
   2. reacting said polyester with an amount of phthalic anhydride sufficient to provide at least one free carboxyl functionality per 1000 gms; and
   3. neutralizing free carboxyl groups in the polyester of step (2) to provide a water soluble polyester resin.

3. The process of claim 2, wherein said polyol comprises pentaerythritol and an aliphatic diol.

4. The process of claim 3 wherein said aliphatic diol is neopentyl glycol.

5. The process of claim 4, wherein the molar ratio of neopentyl glycol to pentaerythritol is in the range of 2:1 to 10:1.

6. The process of claim 2 wherein said polybasic acid comprises an aliphatic and an aromatic dibasic acid.

7. The process of claim 6, wherein said aliphatic dibasic acid is adipic acid and said aromatic acid is isophthalic acid.

8. A polyester resin comprising adipic acid isophthalic acid, neopentyl glycol and pentaerythritol in the approximate molar ratio 3:4:7:2.

9. The polyester resin of claim 8, reacted with about 2 molar proportions of phthalic anhydride.

10. A water-soluble polyester resin comprising the base neutralized product of claim 9.

11. A baked coating comprising the aminoplast cross-linked product of claim 10.

12. A process for the preparation of polyester resin coating compositions comprising reacting at least one polybasic acid with a molar excess of a polyol comprising neopentyl glycol and pentaerythritol in a molar ratio of said pentaerythritol of between about 2:1 and 10:1 to provide a hydroxyl terminated polyester resin having an excess hydroxyl value of 10 to 25%; reacting said hydroxyl terminated polyester with phthalic anhydride to provide a resin with an acid number between about 50 and 60; and neutralizing sufficient carboxyl functionality by reaction with a base to afford water solubility characteristics.

* * * * *